United States Patent
Zawacki

(10) Patent No.: US 9,869,438 B2
(45) Date of Patent: Jan. 16, 2018

(54) DYNAMIC LOGO PROJECTION SYSTEM AND METHOD OF USING THE SAME

(71) Applicant: GM GLOBAL TECHNOLOGY OPERATIONS LLC, Detroit, MI (US)

(72) Inventor: Jeffrey T. Zawacki, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/153,184

(22) Filed: May 12, 2016

(65) Prior Publication Data
US 2017/0329210 A1  Nov. 16, 2017

(51) Int. Cl.
*F21S 10/00* (2006.01)
*G03B 21/14* (2006.01)
*B60Q 1/56* (2006.01)
*G03B 29/00* (2006.01)
*G02B 27/08* (2006.01)

(52) U.S. Cl.
CPC .............. *F21S 10/007* (2013.01); *B60Q 1/56* (2013.01); *G03B 21/142* (2013.01); *G03B 29/00* (2013.01); *B60Q 2400/40* (2013.01); *B60Q 2400/50* (2013.01); *G02B 27/08* (2013.01)

(58) Field of Classification Search
CPC .............. F21S 10/007; B60Q 2400/40; B60Q 2400/50; G02B 27/08
See application file for complete search history.

(56) References Cited

U.S. PATENT DOCUMENTS

| | | | | |
|---|---|---|---|---|
| 6,133,907 A * | 10/2000 | Liu | ........................ | G09F 19/18 345/180 |
| 6,220,737 B1 * | 4/2001 | Baragona | ............. | B60Q 1/0483 362/339 |
| 6,267,478 B1 * | 7/2001 | Chen | ..................... | F21S 10/007 353/84 |
| 6,402,344 B1 * | 6/2002 | Palazzo | ................. | F21S 10/007 362/268 |
| 6,623,144 B2 * | 9/2003 | Bornhorst | ............. | F21S 10/007 348/E5.141 |
| 6,685,347 B2 * | 2/2004 | Grutze | .................... | G09F 19/18 353/13 |
| 6,769,792 B1 * | 8/2004 | Bornhorst | ............. | F21S 10/007 348/E5.141 |
| 7,641,347 B2 * | 1/2010 | Hunt | ..................... | F21S 10/007 345/32 |

(Continued)

*Primary Examiner* — Bao-Luan Le
(74) *Attorney, Agent, or Firm* — Quinn IP Law

(57) ABSTRACT

A system for dynamically projecting a logo onto a surface includes a light source, moveable lenses, and an actuator. The light source emits light toward the surface. The lenses are positioned with between the light source and the surface, with each lens having multiple transparent portions configured to permit some of the emitted light to pass through the lens in a corresponding light pattern. Each corresponding light pattern forms a different part of the logo. The actuator moves the lenses with respect to the emitted light in response to a control signal to thereby cause projection of the logo onto the surface. A vehicle includes a body having a door, road wheels in contact with a road surface, and the system which projects the logo onto the road surface proximate the door. The controller may be programmed to execute a method for projecting the logo.

16 Claims, 3 Drawing Sheets

(56) References Cited

U.S. PATENT DOCUMENTS

| | | | | |
|---|---|---|---|---|
| 8,746,891 B2* | 6/2014 | Jorgensen | G03B 33/06 | 353/31 |
| 8,757,809 B2* | 6/2014 | Jorgensen | G03B 33/06 | 353/30 |
| 8,770,762 B2* | 7/2014 | Jorgensen | F21S 10/007 | 313/110 |
| 8,922,388 B2* | 12/2014 | Nykerk | B60Q 1/0023 | 340/468 |
| 9,274,342 B2* | 3/2016 | Chien | G02B 27/08 | |
| 9,321,395 B2* | 4/2016 | Ammar | B60R 1/12 | |
| 9,410,670 B2* | 8/2016 | Outland | F21S 10/007 | |
| 9,719,668 B2* | 8/2017 | Allan | F21V 21/30 | |
| 2002/0015305 A1* | 2/2002 | Bornhorst | F21S 10/007 | 362/293 |
| 2003/0035290 A1* | 2/2003 | Bornhorst | F21S 10/007 | 362/318 |
| 2003/0156424 A1* | 8/2003 | Grutze | G09F 19/18 | 362/514 |
| 2005/0206328 A1* | 9/2005 | Hunt | F21S 10/007 | 315/294 |
| 2008/0285293 A1* | 11/2008 | Sato | B60Q 1/2665 | 362/487 |
| 2010/0253919 A1* | 10/2010 | Douglas | G03B 21/14 | 353/13 |
| 2010/0321945 A1* | 12/2010 | Lang | B60Q 1/2669 | 362/501 |
| 2011/0273671 A1* | 11/2011 | Chu | G03B 21/14 | 353/13 |
| 2012/0147333 A1* | 6/2012 | Jorgensen | G03B 33/06 | 353/31 |
| 2012/0154759 A1* | 6/2012 | Jorgensen | G03B 33/06 | 353/31 |
| 2012/0200828 A1* | 8/2012 | Chien | A63H 33/22 | 353/1 |
| 2012/0313980 A1* | 12/2012 | Kjaer | F21S 10/007 | 345/690 |
| 2012/0320102 A1* | 12/2012 | Jorgensen | F21S 10/007 | 345/690 |
| 2013/0027442 A1* | 1/2013 | Jorgensen | F21S 10/007 | 345/690 |
| 2013/0058095 A1* | 3/2013 | Outland | F21S 10/007 | 362/283 |
| 2013/0208479 A1* | 8/2013 | Allan | F21S 10/007 | 362/271 |
| 2014/0192080 A1* | 7/2014 | Hunt | H04N 9/3182 | 345/601 |
| 2014/0218212 A1* | 8/2014 | Nykerk | B60Q 1/0023 | 340/901 |
| 2014/0320823 A1* | 10/2014 | Ammar | B60R 1/12 | 353/13 |
| 2015/0070656 A1* | 3/2015 | Chien | G02B 27/08 | 353/1 |
| 2015/0092418 A1* | 4/2015 | Jurik | F21S 10/007 | 362/282 |
| 2016/0069540 A1* | 3/2016 | Kjeldsen | F21S 10/00 | 362/232 |
| 2016/0116833 A1* | 4/2016 | Chien | A63H 33/22 | 353/2 |
| 2016/0193959 A1* | 7/2016 | Ammar | B60R 1/12 | 353/13 |
| 2017/0108187 A1* | 4/2017 | Jurik | F21S 10/007 | |

* cited by examiner

DYNAMIC LOGO PROJECTION SYSTEM AND METHOD OF USING THE SAME

TECHNICAL FIELD

The present disclosure pertains to a dynamic logo projection lamp and a method of using the same.

BACKGROUND

Lighting is used for various functional and aesthetic purposes. For instance, attaching a lighting assembly to or near a surface of a component helps improve the overall visibility of the lighted surface as well as the surrounding environment. In vehicle applications in particular, external lighting is typically provided via headlight and taillight assemblies positioned at the front and rear of the vehicle, respectively. External lighting functions include the daytime running light or "DRL" function, position function, and turn signal indication. However, conventional lighting devices used for such operating functions may be less than optimal for other purposes such as alerting the operator to non-driving functions, or when alerting the operator to a detected presence when the operator is approaching, entering, or exiting the vehicle.

SUMMARY

A logo projection system is disclosed herein that is operable for dynamically projecting a logo onto a surface. The system includes a light source, moveable lenses, and one or more actuators operable for rotating or otherwise moving the lenses within or with respect to light emitted by the light source. The light source is configured to emit the light toward the surface, e.g., a road surface when the system is used as part of a vehicle.

The lenses are positioned between the light source and the surface. Each lens includes transparent portions configured to permit some of the emitted light to pass through the lens in a corresponding light pattern, with each corresponding light pattern of the various lenses forming a different part of the logo. The actuator(s) are operable for rotating or otherwise positioning the lenses in response to a control signal to thereby project the logo onto the surface.

The transparent portions of each of the lenses may be surrounded by opaque portions, with the opaque portions blocking all of the emitted light not passing through the transparent portions. In some embodiments, the lenses may be circular discs or plates having a painted or plated surface as the opaque portion. Alternatively, the lenses may have an etched surface as the opaque portion. The circular discs or plates may be rotatable via operation of the actuator(s).

The control signal may be a radio frequency signal or a light signal in different example configurations.

The system may include a controller programmed to detect a predetermined condition, e.g., the proximity of an operator of the vehicle, and to generate the control signal when the predetermined condition is detected.

The controller may also be configured to command rotation or movement of the lenses according to a calibrated sequence such that the logo is progressively constructed and projected onto the surface in multiple stages over a calibrated duration.

The system may include a projector lens having a convex outer surface, with the plurality of lenses positioned between the light source and the projector lens. In such an embodiment, the logo as projected onto the surface appears magnified with respect to a size of the same logo as it appears in its constituent parts on the rotatable lenses.

A vehicle is also disclosed herein that includes a body having a door, road wheels in contact with a road surface, and a system operable for dynamically projecting a logo onto the road surface. In an embodiment, the system includes a light source configured to emit light toward the road surface proximate the door, e.g., a rear door or lift gate, and a plurality of rotatable lenses positioned with between the light source and the road surface. Each of the lenses includes multiple transparent portions configured to permit some of the emitted light to pass therethrough in a corresponding light pattern, with each corresponding light pattern forming a different part of the logo.

The system in this particular embodiment of the vehicle includes an actuator or multiple actuators operable for individually rotating the lenses with respect to the emitted light in response to a projection control signal, which causes projection of the logo onto the road surface. A controller of the system is programmed to detect a predetermined condition, and to generate the projection control signal in response to detection of a predetermined condition, with the projection control signal commanding a positioning of each of the lenses according to a calibrated sequence such that the logo is projected onto the road surface in different stages over a calibrated duration.

A method is also disclosed for dynamically projecting the logo onto a surface via the logo projection system. The method may include providing a plurality of lenses between a light source and a surface, e.g., as part of a vehicle or other apparatus, with each lens having multiple transparent portions. The transparent portions of a respective one of the lenses are configured to permit some of the emitted light from the light source to pass through the respective lens in a corresponding light pattern, with each of the corresponding light patterns forming a different part of the logo.

The method also includes receiving input signals, via a controller, that are indicative of a predetermined condition, and then activating the light source via the controller in response to the received input signals to thereby cause the light source to emit light. Additionally, the method includes transmitting projector control signals to one or more actuators to cause the actuators to sequentially rotate the lenses, starting with the lens that is positioned closest to the light source, until the logo is fully constructed.

The method may include projecting the fully constructed logo onto the surface via the system for a calibrated duration. After completion of the calibrated duration, the method may include transmitting the projector control signals to the actuators to cause the actuators to sequentially rotate the lenses in the opposite direction, i.e., starting with the lens positioned closest to the surface, to fully dissolve and cease projection of the logo onto the surface.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

DETAILED DESCRIPTION

Figure 1:
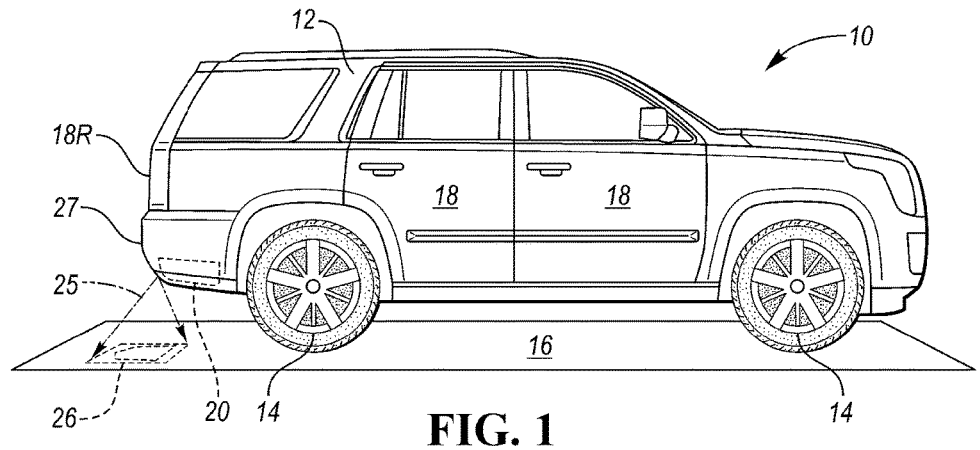
FIG. 1 is a schematic illustration of an example vehicle having a system for dynamically projecting a logo onto a surface as set forth herein.

Referring to the drawings, wherein like reference numbers refer to the same or like components in the several Figures, an apparatus 10 is shown in FIG. 1 having a logo projection system 20 operable for projecting a logo 26 onto a surface 16 using light (arrows 25). The apparatus 10 may be a vehicle as shown or any other mobile or stationary apparatus. That is, one of ordinary skill in the art will appreciate that the system 20 described herein lends itself to various applications, both vehicular and non-vehicular, including but not limited to residential or commercial building applications, sales displays, and customized appliance lighting, as well as non-automotive applications such as aircraft, trains, and boats. Likewise, while an example external lighting application is described herein, the present disclosure may be similarly applied to internal lighting applications. For illustrative consistency, the apparatus 10 of FIG. 1 will be described hereinafter as the vehicle 10, and the surface 16 as a road surface 16, without limiting the range of possible applications and embodiments.

Figure 2A:
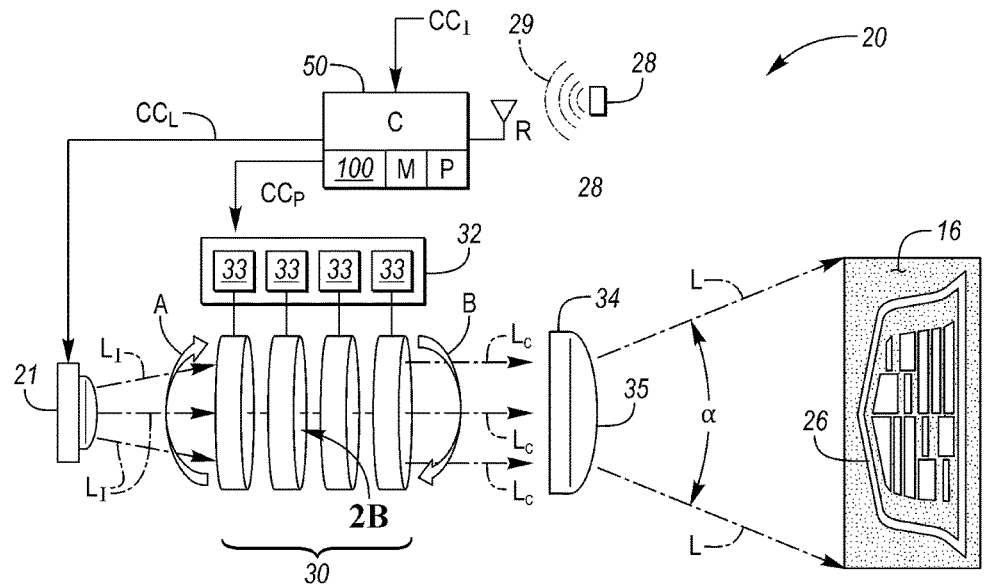
FIG. 2A is a schematic illustration of an example system for dynamically projecting a logo onto a surface.

The logo projection system 20 is operable for dynamically projecting the logo 26 onto the road surface 16 in response to receipt of an input signal (arrow $CC_I$ of FIG. 2A). As used herein, the term "logo" refers to any symbol, mark, pattern, text, emblem, or graphic, which may be associated with the vehicle 10 in some embodiments. For instance, a recognizable trademark corresponding to the particular brand or model of the vehicle 10 may be used as the logo 26 as shown in FIG. 2A. Projection of such a logo 26 onto the road surface 16 is thus intended to increase brand recognition while providing a value-added lighting feature.

The example vehicle 10 of FIG. 1 may include a body 12 having doors 18, possibly including a rear door 18R. The rear door 18R may be variously embodied as a vertical lift gate, a drop-style tailgate, or a conventional hinged door assembly in different configurations. The vehicle 10 includes a set of road wheels 14 in rolling frictional contact with the road surface 16. The logo projection system 20 lends itself to applications in which the road surface 16 is within proximity of the system 20, e.g., within a distance of about 1 m or less, the road surface 16 is sufficiently reflective for displaying the logo 26 when the road surface 16 is illuminated with the light (arrows 25) from the system 20, and an operator's proximity and/or a predetermined gesture is detectable, e.g., via an active or passive radio frequency (RF) key fob 28 as shown in FIG. 2A.

The logo projection system 20 is shown in FIG. 1 as being positioned within a rear fascia 27 of the body 12 proximate the rear door 18R. Such an application may be suitable for use with automatic opening of the rear door 18R, e.g., via RF detection, gesture detection, or other remote sensing of an operator's presence, as is well known in the art. For instance, automatic "hands free" or "arms full" systems exist which allow an operator to break a light beam (not shown) using a particular gesture, or to demonstrate a particular pattern or gesture of the RF key fob 28 of FIG. 2A, to thereby cause the rear door 18R to open automatically. Other applications may be envisioned that would position the system 20, and thus projection of the logo 26, at or near another area such as adjacent to a driver-side or passenger-side door 18.

The logo projection system 20 as shown in further detail in FIG. 2A is configured to progressively construct the logo 26 via position control of a plurality of moveable lenses 30, doing so in response to receipt of the input signal (arrow $CC_I$) by a controller (C) 50. For instance, the logo 26 may be broken or divided into different constituent logo parts as shown in FIGS. 3A-D, with each logo part provided by a different one of the lenses 30. The controller 50 may control a position of the lenses 30 with respect to a light source 21, e.g., a rotational or angular position of each lens 30 in a path of the emitted light ($L_I$), in order to enable the logo 26 to be progressively built or constructed over a calibrated duration. While a single light source 21 is described herein, it may be possible to position separate light sources 21 between adjacent lenses 30 and progressively illuminate the lenses 30 in the stages described above, with or without movement of some or all of the lenses 30. Control of the lenses 30 and/or the lighting progression allows the logo 26 to be sequentially projected onto the road surface 16 in multiple discrete stages, with each stage of projection building upon prior stages until the logo 26 is fully constructed.

The logo projection system 20 may also include a projector lens 34 having a convex outer surface 35. The projector lens 34 may be used such that the logo 26 ultimately projected onto the road surface 16 is magnified with respect to a size of the same logo 26 in its constituent parts on the individual lenses 30. That is, a beam of largely collimated light (arrows $L_C$) passing through the lenses 30 may be enlarged into a diffused beam (arrow L) having a beam width α. Thus, the projector lens 34 may be configured to provide the logo 26 with a desired size, with the actual configuration of the projector lens 34 depending on the distance to the road surface 16 and the desired size of the logo 26.

The light source 21 may be embodied as any light source or multiple light sources operable for emitting the light (arrows $L_I$) toward the road surface 16. By way of example, the light source 21 may include a plurality of light-emitting diodes, incandescent lights, halogen lights, or any other suitable lighting source. The logo projection system 20 also includes the lenses 30, with the lenses 30 positioned with between the light source 21 and the road surface 16.

Figure 2B:
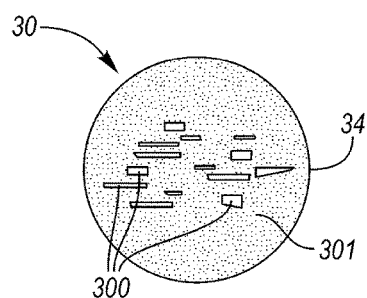
FIG. 2B is a schematic plan view illustration of an example lens usable as part of the system shown in FIG. 2A.

As shown in the schematic plan view of FIG. 2B, each of the lenses 30 may be embodied as a circular disc or plate having a surface 34. The surface 34 includes substantially transparent portions 300 surrounded by opaque portions 301. As used herein, "substantially transparent" means a level of light permittivity that is sufficient for creating the logo 26 with a desired intensity. That is, the transparent portions 300 may be translucent to some extent, e.g., at least about 80% transparent. The opaque portions 301 in turn are configured to block the emitted incident light (arrows $L_I$) that does not pass through the transparent portions 300. Any unblocked incident light (arrows $L_I$) from the light source 21 thus passes fully through each lens 30 in a corresponding light pattern, examples of which are shown in FIGS. 3A-D and explained below. Each corresponding light pattern forms a different part of the logo 26. As will be appreciated by one of ordinary skill in the art, the lenses 30 are required to be aligned or oriented such that the opaque portions 301 of a given lens 30 do not block the light passing through another lens 30 located closer to the light source 21.

In one possible embodiment, the lenses 30 are all individually rotatable via an actuator assembly 32 having multiple linear or rotary actuators 33. Each actuator 33 is connected to and operable for rotating a respective one of the lenses 30 in response to a projection control signal (arrow $CC_P$). For example, the actuator assembly 32 may have, as the actuators 33, a plurality of linear or rotary actuators each operable for rotating a given one of the lenses 30 through a range of motion as indicated by arrow A, e.g., a quarter turn, such that emitted light (arrows $L_I$) ordinarily blocked by the opaque portions 301 is instead permitted to pass as the collimated light (arrows $L_C$) fully through the transparent portions 300 of each subsequent lens 30.

Non-limiting example actuators 33 may include solenoid devices, electro-mechanical pistons, ball screw devices, shape memory alloy (SMA) actuators, or any other suitable actuator. In other embodiments, the periphery of the lenses 30 may be splined or toothed (not shown), and the actuators 33 may include mating splines or teeth (not shown), such that rotation of a given actuator 33 imparts a desired amount of rotation to the lens 30 to which that particular actuator 33 is engaged. Sequential rotation of the lenses 30 in the opposite direction as indicated by arrow B causes the logo 26 to appear to slowly and sequentially dissolve and ultimately disappear, at which point a lighting control signal (arrow $CC_L$) can be transmitted by the controller 50 to the light source 21 to open a switch (not shown) or otherwise turn off the light source 21.

To achieve the desired projection effect, the rotatable lenses 30 may be embodied as circular discs as shown FIG. 2B and constructed of impact-resistant plastic or glass each having a painted or plated surface 34 forming the opaque portions 301. Alternatively, the rotatable lenses 30 may have an etched surface as the opaque portion 301. Other possible embodiments may include housing the transparent portions 300 in a solid frame of metal or plastic, with such a frame serving as the opaque portions 301, or with the solid frame defining openings forming the transparent portions 300.

Figure 3A:
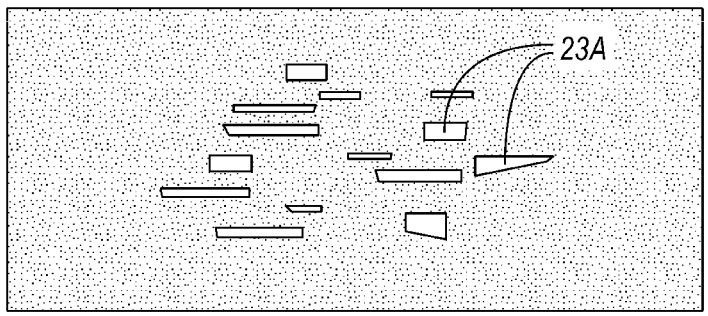
FIGS. 3A-D show example progressive stages of construction and dynamic projection of a logo onto a surface according to the present disclosure.
Figure 3B:
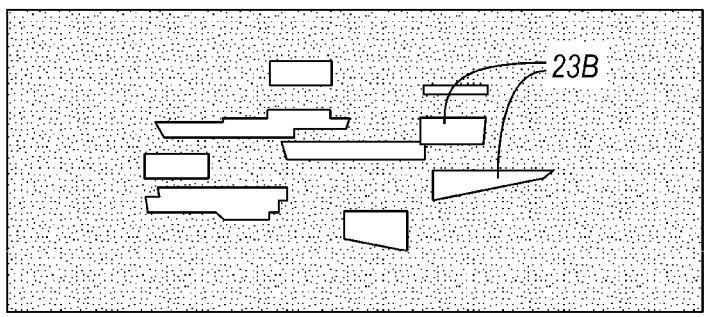
Figure 3C:
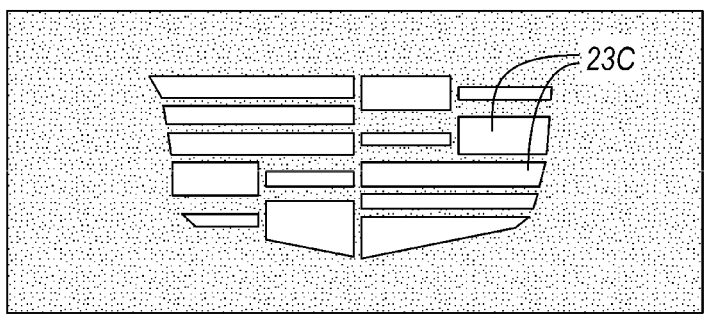
Figure 3D:
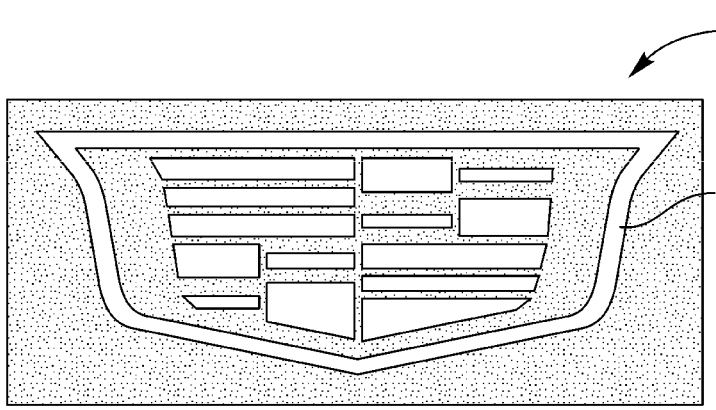

Referring briefly to FIGS. 3A-D, an example sequential or staged formation and projection of the logo 26 is shown, with FIG. 3D depicting the completely formed logo 26 and FIGS. 3A-3D showing the logo 26 as logo portions 23A-D in first, second, third, and fourth stages of logo construction, respectively. Although depicted schematically and not to scale, it is intended that FIG. 3B includes the light pattern of FIG. 3A, FIG. 3C includes the overlaid light patterns of FIGS. 3A and 3B, and FIG. 3D includes the overlaid light patterns of FIGS. 3A-C.

Additionally, while four different logo stages corresponding to the use of four lenses 30 in the FIG. 2A example are shown, those of ordinary skill in the art will appreciate that fewer or more lenses 30 can be used to construct the logo 26 in fewer or more stages as desired. Likewise, a calibratable time delay between the stages of construction of the logo 26 may be programmed or selected to allow for more rapid or slower progression through the projection stages, with the amount of such delay possibly being selectable by the operator of the vehicle 10 in some embodiments. Thus, the controller 50 of FIG. 2A may be configured to command individual rotation of the lenses 30 according to a calibrated sequence and duration.

Referring again to FIG. 2A, the controller 50 may include a processor (P) and memory (M), i.e., sufficient amounts of read-only memory, optical memory, flash memory, and the like. The controller 50 may also include a receiver (R) such as an RF antenna, which is operable for receiving the input signals (arrow $CC_I$) in some embodiments. Transitory memory such as random access memory and electrically-erasable programmable read-only memory may also be included as needed, along with other required circuitry, including but not limited to a high-speed clock, analog-to-digital circuitry, digital-to-analog circuitry, a digital signal processor, and any necessary input/output devices and other signal conditioning and/or buffer circuitry. The controller 50 may be programmed to execute a method 100 for using the logo projection system 20 described above, with an example of method 100 described below with reference to FIG. 4.

In an example configuration, the controller 50 of FIG. 2A may be programmed such that the input signal (arrow $CC_I$) is a radio frequency (RF) signal 29, e.g., from the key fob 28, or a cell phone, an ultrasonic transmitter, or another remote device. Other embodiments may be readily envisioned, such as a light signal from a broken light beam pattern in certain known hands-free door opening embodiments. Thus, the controller 50 can be programmed to detect a predetermined condition, such as the broken beam pattern or RF signal 29 indicative of proximity of an operator, and to generate the projection control signal ($CC_P$) and lighting control signal (arrow $CC_L$) only when the predetermined condition is detected.

Figure 4:
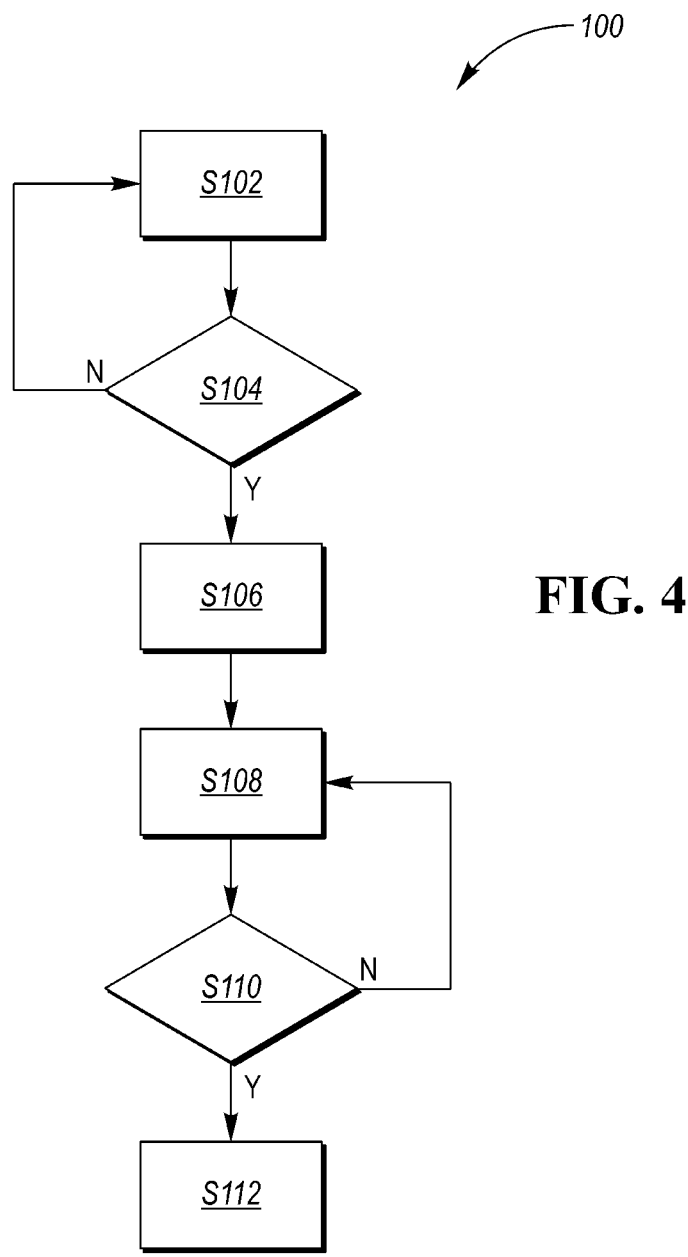
FIG. 4 is a flow chart describing an example method for dynamically projecting a logo onto a surface.

FIG. 4 is a flow chart describing an example embodiment of the method 100 for using the logo projection system 20 of FIGS. 1 and 2 to dynamically project the logo 26 onto a surface, in this instance the road surface 16. Beginning with step S102, after first providing and configuring the lenses 30 described above, the controller 50 of FIG. 2A receives the input signals (arrow $CC_I$). As explained above, the input signals (arrow $CC_I$) may be indicative of a predetermined condition, i.e., a threshold condition triggering activation of the light source 21. Such a predetermined condition may include a relative proximity of an operator to the vehicle 10, e.g., via an RF device such as the key fob 28 shown in FIG. 2A, or an operator or occupant of another apparatus in other embodiments, or it may include the detection of another predetermined condition such as a particular beam-breaking gesture in the example hands-free light-based application noted above. The method 100 proceeds to step S104 after the controller 50 detects the input signals (arrow $CC_I$).

Step S104 entails determining whether the input signals (arrow $CC_I$) from step S102 correspond to a threshold condition indicative of a request to activate the logo projection system 20 and thereby initiate dynamic projection of the logo 26 onto the road surface 16 of FIG. 1. The controller 50 may be programmed with such a threshold condition, for instance in the form of a threshold distance or proximity of the operator to the vehicle 10, or a successful detection of a particular gesture of the operator. The method 100 proceeds to step S106 when the threshold condition is successfully detected.

At step S106 the controller 50 activates the light source 21 of FIG. 2A. Step S106 may include transmitting the lighting control signal (arrow $CC_L$) to the light source 21 to close a switch (not shown), which would serve to connect the light source 21 to a power supply such as an auxiliary battery (not shown) and thus cause the light source 21 to turn on. The method 100 proceeds to step S108 when the light source 21 has been activated.

At step S108, the controller 50 sequentially controls the lenses 30 by transmitting the projector control signals (arrow $CC_L$) to the actuators 33. The actuators 33, upon receipt of the projector control signals (arrow $CC_L$), are caused to individually and sequentially rotate a corresponding one of the lenses 30, starting with the lens 30 that is positioned closest to the light source 21 of FIG. 2A and progressing outward toward the projector lens 34 until the logo 26 is fully constructed. The method 100 then proceeds to step S110.

Step S110 entails determining whether to cease projection of the logo 26. For example, the controller 50 may initiate a timer upon completion of step S108 and then project the logo 26 for a calibrated duration, e.g., about 5 to 10 seconds. In such an embodiment, the controller 50 can make a control decision to cease projection of the logo 26 when the timer reaches the calibrated duration. The controller 50 may be programmed to cease projection of the logo 26, alone or in conjunction with the timer, in response to an override signal in other embodiments, such as a detected key-on event in which the operator starts the vehicle 10. The method 100 then proceeds to step S112.

At step S112, the controller 50 executes the reverse sequence as described for step S108, i.e., by selectively rotating the lenses 30 starting with the lens 30 located closest to the projection lens 34 or road surface 16 to progressively break down, fade, and ultimately dissolve the logo 26 in stages. The method 100 is complete when the logo 26 is no longer projected onto the road surface 16, at which point the controller 50 can transmit the lighting control signal (arrow $CC_L$) to the light source 21 to open a switch or otherwise disconnect power the light source 21.

The best modes for carrying out the disclosure have been described in detail. Those familiar with the art to which this disclosure relates will recognize, however, that various alternative designs and embodiments within the scope of the appended claims. Thus, the present disclosure is not limited to the precise construction and compositions disclosed herein, with variations apparent from the foregoing descriptions being within the scope of the disclosure as defined in the appended claims. Moreover, the present concepts expressly include any and all combinations and sub-combinations of the preceding elements and aspects.

Additionally, as used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The invention claimed is:

1. A system for dynamically projecting a logo onto a surface, the system comprising:
   a light source configured to emit light toward the surface;
   a plurality of rotatable lenses positioned between the light source and the surface, the lenses each being a disc or a plate and having a painted, etched, or plated surface forming an opaque portion, each lens including multiple transparent portions configured to permit some of the emitted light to pass therethrough in a corresponding light pattern, wherein each of the corresponding light patterns forms a different constituent part of the logo; and
   an actuator operable for rotating the lenses with respect to the emitted light in response to a control signal to thereby cause the logo to be progressively constructed and projected onto the surface over a calibrated duration.

2. The system of claim 1, wherein the light source includes a plurality of light-emitting diodes.

3. The system of claim 1, wherein the transparent portions of the lenses are surrounded by an opaque portion configured to block all of the emitted light that does not pass through the transparent portions.

4. The system of claim 1, wherein the control signal is a radio frequency signal.

5. The system of claim 1, wherein the system is connected to a body of a vehicle in contact with a road surface, and wherein the surface is the road surface.

6. The system of claim 1, further comprising a controller programmed to detect a predetermined condition and generate the control signal only when the predetermined condition is detected.

7. The system of claim 1, further comprising a controller configured to command positioning of each of the lenses according to a calibrated sequence such that the logo is progressively constructed and projected onto the surface in different stages over the calibrated duration.

8. The system of claim 1, further comprising a projector lens having a convex outer surface, wherein the plurality of lenses are positioned between the light source and the projector lens.

9. A vehicle comprising:
   a body having a door;
   road wheels in contact with a road surface; and
   a system operable for dynamically projecting a logo onto the road surface, wherein the system includes:
      a light source configured to emit light toward the road surface proximate the door;
      a plurality of rotatable lenses positioned between the light source and the road surface, the lenses being circular discs or plates each having a painted, etched, or plated surface forming opaque portions, and each lens including multiple transparent portions configured to permit some of the emitted light to pass therethrough in a corresponding light pattern, wherein each of the corresponding light patterns forms a different constituent part of the logo;
      an actuator operable for individually rotating the lenses with respect to the emitted light in response to a projection control signal to thereby cause projection of the logo onto the road surface; and
      a controller programmed to detect a predetermined condition, and to generate the projection control signal in response to detection of a predetermined condition, wherein the projection control signal commands a positioning of each of the lenses according to a calibrated sequence such that the logo is progressively constructed from the constituent parts and projected onto the road surface in different stages over a calibrated duration.

10. The vehicle of claim 9, wherein the transparent portions of the rotatable lenses are surrounded by an opaque portion configured to block all of the emitted light that does not pass through the transparent portions.

11. The vehicle of claim 9, further comprising a projector lens having a convex outer surface, wherein the plurality of rotatable lenses are positioned between the light source and the projector lens.

12. A method for dynamically projecting a logo onto a surface via a logo projection system, the method comprising:
   providing a plurality of rotatable lenses between a light source and the surface, wherein each lens is a circular disc or plate having a painted, etched, or plated surface forming opaque portions, and each lens has multiple transparent portions, the transparent portions of a respective one of the lenses are configured to permit some of the emitted light from the light source to pass through the respective lens in a corresponding light pattern, and each of the corresponding light patterns forms a different constituent part of the logo;

receiving input signals, via a controller, that are indicative of a predetermined condition;

activating a light source via the controller in response to the received input signals to thereby cause the light source to emit light; and transmitting projector control signals to one or more actuators to cause the actuators to sequentially rotate the lenses, starting with one of the lenses that is positioned closest to the light source, to thereby cause the logo to be progressively constructed from the constituent parts of the logo over a calibrated duration until the logo is fully constructed on the surface.

13. The method of claim 12, further comprising:

projecting the fully constructed logo onto the surface via the system for another calibrated duration; and transmitting the projector control signals to the actuators to cause the actuators to sequentially rotate the lenses, starting with one of the lenses that is positioned closest to the surface, to cease projection of the logo onto the surface.

14. The method of claim 12, wherein receiving input signals includes receiving a radio frequency signal from a remote device.

15. The method of claim 14, wherein activating a light source includes energizing a plurality of light-emitting diodes arranged on or within a body of a vehicle in contact with a road surface, the remote device is a key fob of the vehicle, and the surface is the road surface.

16. The method of claim 15, wherein the body includes a rear fascia positioned proximate a rear door or light gate of the vehicle, and wherein the plurality of light-emitting diodes are positioned on or within the rear fascia.

* * * * *